(12) United States Patent
Chiang et al.

(10) Patent No.: US 8,364,931 B2
(45) Date of Patent: Jan. 29, 2013

(54) MEMORY SYSTEM AND MAPPING METHODS USING A RANDOM WRITE PAGE MAPPING TABLE

(75) Inventors: Chun-Ying Chiang, Chiayi (TW); Po-Ching Lu, Taichung (TW)

(73) Assignee: Mediatek Inc., Hsin-Chu (TW)

( * ) Notice: Subject to any disclaimer, the term of this patent is extended or adjusted under 35 U.S.C. 154(b) by 403 days.

(21) Appl. No.: 12/694,463

(22) Filed: Jan. 27, 2010

(65) Prior Publication Data
US 2010/0332732 A1 Dec. 30, 2010

Related U.S. Application Data

(60) Provisional application No. 61/221,114, filed on Jun. 29, 2009.

(51) Int. Cl.
*G06F 12/10* (2006.01)
(52) U.S. Cl. .. 711/206; 711/103; 711/202; 711/E12.008
(58) Field of Classification Search .................. None
See application file for complete search history.

(56) References Cited

U.S. PATENT DOCUMENTS

| | | | |
|---|---|---|---|
| 7,529,879 B2 | 5/2009 | Kim et al. | |
| 2006/0179212 A1* | 8/2006 | Kim et al. | 711/103 |
| 2008/0098195 A1* | 4/2008 | Cheon et al. | 711/202 |
| 2008/0189490 A1 | 8/2008 | Cheon et al. | |
| 2009/0193184 A1* | 7/2009 | Yu et al. | 711/103 |
| 2010/0169544 A1* | 7/2010 | Eom et al. | 711/103 |
| 2011/0219180 A1* | 9/2011 | Cheon et al. | 711/103 |
| 2011/0307646 A1* | 12/2011 | Lee et al. | 711/103 |

FOREIGN PATENT DOCUMENTS
CN 101241474 8/2008

OTHER PUBLICATIONS

Jesung Kim; Jong Min Kim; Noh, S.H.; Sang Lyul Min; Yookun Cho; , "A space-efficient flash translation layer for CompactFlash systems," Consumer Electronics, IEEE Transactions on , vol. 48, No. 2, pp. 366-375, May 2002.*
Chanik Park, Wonmoon Cheon, Jeonguk Kang, Kangho Roh, Wonhee Cho, and Jin-Soo Kim. 2008. A reconfigurable FTL (flash translation layer) architecture for NAND flash-based applications. ACM Trans. Embed. Comput. Syst. 7, 4, Article 38 (Aug. 2008), 23 pages.*
English language translation of abstract of CN 101241474 (published Aug. 13, 2008).

* cited by examiner

*Primary Examiner* — Edward Dudek, Jr.
*Assistant Examiner* — Ralph A Verderamo, III
(74) *Attorney, Agent, or Firm* — McClure, Qualey & Rodack, LLP

(57) ABSTRACT

Memory systems and mapping methods thereof are provided. In one embodiment of a memory system, an interface device is coupled between a flash memory and a host and stores a flash translation layer. The flash translation layer utilizes a data block mapping table and a page mapping table to manage data blocks and log blocks of the flash memory by a page mapping scheme and utilizes a random write page mapping table independent from the block mapping table and the page mapping table to manage the random write blocks by a random write mapping scheme. When a first predetermined condition is satisfied, the flash translation layer converts one of the data blocks (and one of the log block corresponding to the converted data block if any) into random write block(s) and utilizes the random write mapping schemes to manage the random write block(s). When a second predetermined condition is satisfied, the flash translation layer merges and converts random write block(s) into a data block and utilizes the page mapping scheme to manage the converted random write block(s).

34 Claims, 19 Drawing Sheets

Data Block Mapping Table (331A)

| LBN | PBN |
|---|---|
| LB0 | PB100 |
| LB1 | PB101 |
| LB2 | PB102 |
| LB3 | PB103 |
| LB4 | PB201 |
| ... | ... |
| LB105 | PB405 |
| LB106 | PB470 |
| LB107 | PB490 |
| LB108 | PB601 |

Page Mapping Table (332)

| | LPN | PPN | PBN |
|---|---|---|---|
| | LP0 | N/A | N/A |
| | LP1 | N/A | N/A |
| LB108 | LP2 | PPA0 | PB601 |
| | LP3 | PPA1 | PB601 |
| | ... | ... | ... |
| | LP127 | N/A | N/A |

Log Block Mapping Table (331B)

| PBN of Data Block | PBN of Log Block |
|---|---|
| PB100 | PB300 |
| PB102 | PB302 |
| PB201 | PB304 |
| PB601 | PB602 |

FIG. 5A-1

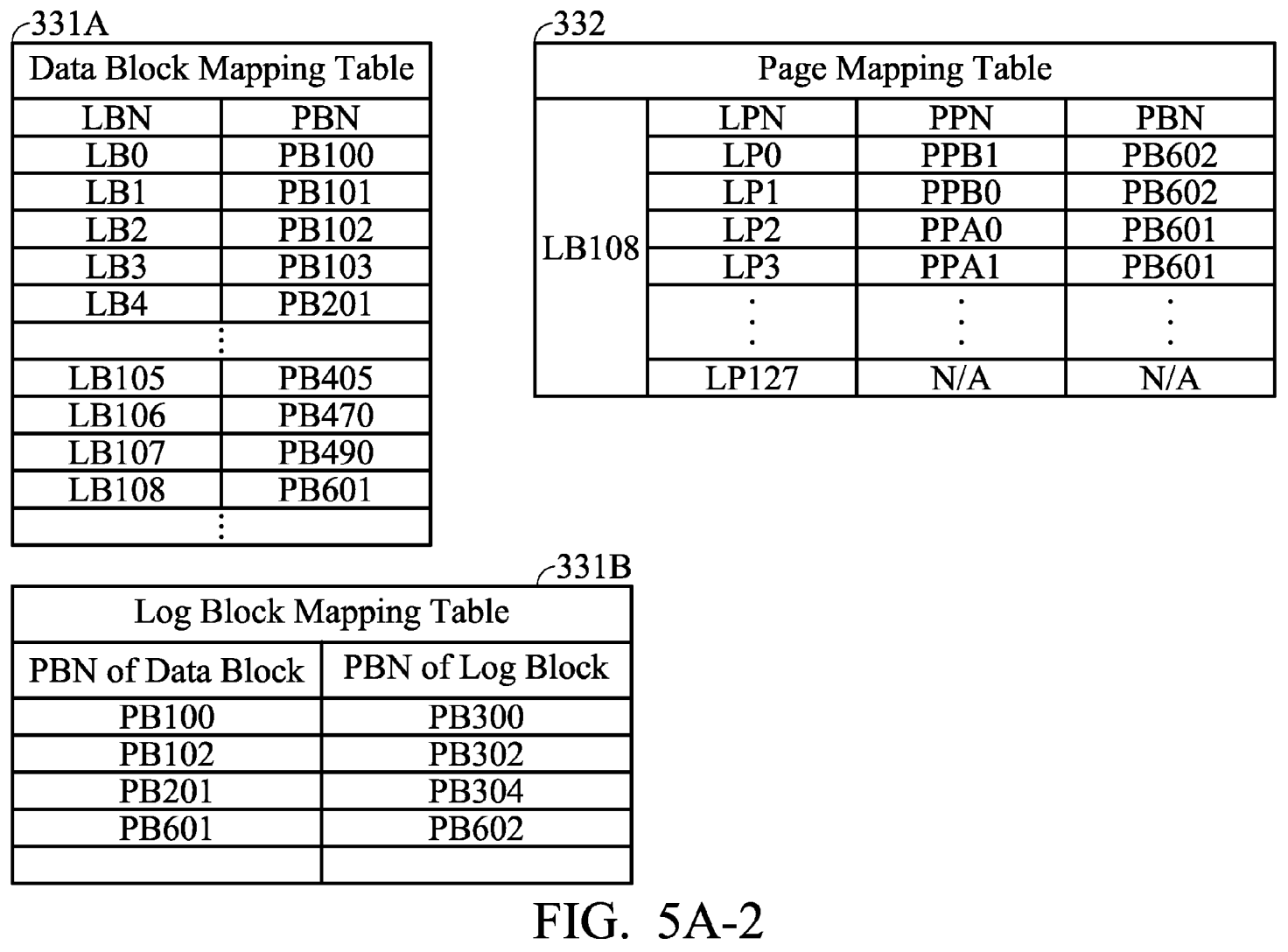

Page Mapping Table (332)

| LPN | PPN | PBN |
|---|---|---|
| LP0 | PPB1 | PB602 |
| LP1 | PPB0 | PB602 |
| LP2 | PPA0 | PB601 |
| LP3 | PPA1 | PB601 |
| ... | ... | ... |
| LP127 | N/A | N/A |

LB108

Data Block Mapping Table (331A)

| LBN | PBN |
|---|---|
| LB0 | PB100 |
| LB1 | PB101 |
| LB2 | PB102 |
| LB3 | PB103 |
| LB4 | PB201 |
| ... | ... |
| LB105 | PB405 |
| LB106 | PB470 |
| LB107 | PB490 |
| LB108 | PB601 |

Log Block Mapping Table (331B)

| PBN of Data Block | PBN of Log Block |
|---|---|
| PB100 | PB300 |
| PB102 | PB302 |
| PB201 | PB304 |
| PB601 | PB602 |

FIG. 5A-2

Data Block Mapping Table (331A)

| LBN | PBN |
|---|---|
| LB0 | PB100 |
| LB1 | PB101 |
| LB2 | PB102 |
| LB3 | PB103 |
| LB4 | PB201 |
| ... | ... |
| LB105 | PB405 |
| LB106 | PB470 |
| LB107 | PB490 |
| LB108 | PB601 |

Page Mapping Table (332) — LB108

| LPN | PPN | PBN |
|---|---|---|
| LP0 | PPB1⇨PPB3 | PB602 |
| LP1 | PPB0 | PB602 |
| LP2 | PPA0 | PB601 |
| LP3 | PPA1⇨PPB2 | PB601⇨PB602 |
| ... | | |
| LP127 | N/A | N/A |

Log Block Mapping Table (331B)

| PBN of Data Block | PBN of Log Block |
|---|---|
| PB100 | PB300 |
| PB102 | PB302 |
| PB201 | PB304 |
| PB601 | PB602 |

FIG. 5A-3

Data Block Mapping Table (331A)

| LBN | PBN |
|---|---|
| LB0 | PB100 |
| LB1 | PB101 |
| LB2 | PB102 |
| LB3 | PB103 |
| LB4 | PB201 |
| ... | ... |
| LB105 | PB405 |
| LB106 | PB470 |
| LB107 | PB490 |
| LB108 | PB601 |

Page Mapping Table (332)

| | LPN | PPN | PBN |
|---|---|---|---|
| | LP0 | PPB3 | PB602 |
| | LP1 | PPB0⇨PPA2 | PB602⇨PB601 |
| | LP2 | PPA0 | PB601 |
| LB108 | LP3 | PPB2 | PB602 |
| | ... | ... | ... |
| | LP127 | N/A | N/A |

Log Block Mapping Table (331B)

| PBN of Data Block | PBN of Log Block |
|---|---|
| PB100 | PB300 |
| PB102 | PB302 |
| PB201 | PB304 |
| PB601 | PB602 |

Page Mapping Table

| LBN | LPN | PPN | PBN |
|---|---|---|---|
| LB108 | LP0 | PPB3 | PB602 |
| | LP1 | PPA2 | PB601 |
| | LP2 | PPA0 | PB601 |
| | LP3 | PPB2 | PB602 |
| | ... | ... | ... |
| | LP127 | N/A | N/A |

333

RW Page Mapping Table

| LBN | LPN | PPN | PBN |
|---|---|---|---|
| LB108 | LP0 | PPB3 | PB602 |
| | LP1 | PPA2 | PB601 |
| | LP2 | PPA0 | PB601 |
| | LP3 | PPB2 | PB602 |
| | ... | ... | ... |
| | LP127 | N/A | N/A |

331A

Data Block Mapping Table

| LBN | PPN |
|---|---|
| LB0 | PB100 |
| LB1 | PB101 |
| LB2 | PB102 |
| LB3 | PB103 |
| LB4 | PB201 |
| ... | ... |
| LB105 | PB405 |
| LB106 | PB470 |
| LB107 | PB490 |
| ... | ... |

331B

Log Block Mapping Table

| PBN of Data Block | PBN of Log Block |
|---|---|
| PB100 | PB300 |
| PB102 | PB302 |
| PB201 | PB304 |

FIG. 5B

Data Block Mapping Table (331A)

| LBN | PBN |
|---|---|
| LB0 | PB100 |
| LB1 | PB101 |
| LB2 | PB102 |
| LB3 | PB103 |
| LB4 | PB201 |
| ... | ... |
| LB105 | PB405 |
| LB106 | PB470 |
| LB107 | PB490 |
| LB108 | PB601 |

Log Block Mapping Table (331B)

| PBN of Data Block | PBN of Log Block |
|---|---|
| PB100 | PB300 |
| PB102 | PB302 |
| PB201 | PB304 |
| PB601 | PB602 |

Page Mapping Table (332)

| | LPN | PPN | PBN |
|---|---|---|---|
| | LP0 | PPB3→PPA3 | PB602→PB601 |
| | LP1 | PPB0→PPA2 | PB602→PB601 |
| LB108 | LP2 | PPA0 | PB601 |
| | LP3 | PPB2 | PB602 |
| | ... | ... | ... |
| | LP127 | N/A | N/A |

FIG. 5C

Page Mapping Table (332)

| LPN | PPN | PBN |
|---|---|---|
| LP0 | PPA3 | PB601 |
| LP1 | PPA2 | PB601 |
| LP2 | PPA0 | PB601 |
| LP3 | PPB2 | PB602 |
| ... | ... | ... |
| LP127 | N/A | N/A |

LB108

RW Page Mapping Table (333)

| LPN | PPN | PBN |
|---|---|---|
| LP0 | PPA3 | PB601 |
| LP1 | PPA2 | PB601 |
| LP2 | PPA0 | PB602 |
| LP3 | PPB2 | |
| ... | ... | ... |
| LP127 | N/A | N/A |

LB108

Data Block Mapping Table (331A)

| LBN | PBN |
|---|---|
| LB0 | PB100 |
| LB1 | PB101 |
| LB2 | PB102 |
| LB3 | PB103 |
| LB4 | PB201 |
| ... | ... |
| LB105 | PB405 |
| LB106 | PB470 |
| LB107 | PB490 |

Log Block Mapping Table (331B)

| PBN of Data Block | PBN of Log Block |
|---|---|
| PB100 | PB300 |
| PB102 | PB302 |
| PB201 | PB304 |
| | |
| | |

FIG. 5D

Data Block Mapping Table (331A)

| LBN | PBN |
|---|---|
| LB0 | PB100 |
| LB1 | PB101 |
| LB2 | PB102 |
| LB3 | PB103 |
| LB4 | PB201 |
| ... | ... |
| LB105 | PB405 |
| LB106 | PB470 |
| LB107 | PB490 |
| LB108 | PB601 |
| LB109 | PB603 |

Page Mapping Table (332")

| | LPN | PPN | PBN |
|---|---|---|---|
| | LP128 | PPC0 | PB603 |
| | LP129 | PPC1 | PB603 |
| LB109 | LP130 | N/A | N/A |
| | LP131 | N/A | N/A |
| | ... | | |
| | LP255 | N/A | N/A |

333″ RW Page Mapping Table

| | LPN | PPN | PBN |
|---|---|---|---|
| LB109 | LP128 | PPC0 | PB603 |
| | LP129 | PPC1 | PB603 |
| | LP130 | PPC2 | PB603 |
| | LP131 | N/A | N/A |
| | ... | ... | ... |
| | LP255 | N/A | N/A |

332″ Page Mapping Table

| | LPN | PPN | PBN |
|---|---|---|---|
| LB109 | LP128 | PPC0 | PB603 |
| | LP129 | PPC1 | PB603 |
| | LP130 | PPC2 | PB603 |
| | LP131 | N/A | N/A |
| | ... | ... | ... |
| | LP255 | N/A | N/A |

331A Data Block Mapping Table

| LBN | PBN |
|---|---|
| LB0 | PB100 |
| LB1 | PB101 |
| LB2 | PB102 |
| LB3 | PB103 |
| LB4 | PB201 |
| ... | ... |
| LB105 | PB405 |
| LB106 | PB470 |
| LB107 | PB490 |
| LB108 | PB601 |

331B Log Block Mapping Table

| PBN of Data Block | PBN of Log Block |
|---|---|
| PB100 | PB300 |
| PB102 | PB302 |
| PB201 | PB304 |
| PB601 | PB602 |

| Data Block Mapping Table | |
|---|---|
| LBN | PBN |
| LB0 | PB100 |
| LB1 | PB101 |
| LB2 | PB102 |
| LB3 | PB103 |
| LB4 | PB201 |
| ... | ... |
| LB105 | PB405 |
| LB106 | PB470 |
| LB107 | PB490 |
| LB108 | PB601⇨PB603 |
| LB109 | PB604 |
| ... | ... |

331A

| Log Block Mapping Table | |
|---|---|
| PBN of Data Block | PBN of Log Block |
| PB100 | PB300 |
| PB102 | PB202 |
| PB201 | PB304 |
| | |

| LPN | PPN | PBN |
|---|---|---|
| LP128 | PPC0→PPC3 | PB603 |
| LP129 | PPC1 | PB603 |
| LP130 | PPC2 | PB603 |
| LP131 | N/A | N/A |
| ... | | |
| LP225 | N/A | N/A |

RW Page Mapping Table

RW Page Mapping Table

| LPN | PPN | PBN |
|---|---|---|
| LP128 | PPC3⇔PPD3 | PB603⇔PB604 |
| LP129 | PPC1⇔PPD0 | PB603⇔PB604 |
| LP130 | PPC2⇔PPD1 | PB603⇔PB604 |
| LP131 | N/A | N/A |
| ... | | |
| LP225 | N/A | N/A |

| RW Page Mapping Table | | | |
|---|---|---|---|
| LPN | | PPN | PBN |
| LP128 | | PPD3⇔PPE0 | PB604⇔PB605 |
| LP129 | | PPD0⇔PPE1 | PB604⇔PB605 |
| LP130 | | PPD1⇔PPE2 | PB604⇔PB605 |
| LP131 | | N/A | N/A |
| ... | | | |
| LP225 | | N/A | N/A |

| Data Block Mapping Table 331A | |
|---|---|
| LBN | PBN |
| LB0 | PB100 |
| LB1 | PB101 |
| LB2 | PB102 |
| LB3 | PB103 |
| LB4 | PB201 |
| ... | ... |
| LB105 | PB405 |
| LB106 | PB470 |
| LB107 | PB490 |
| LB108 | PB601 |
| LB109 | PB606 |
| ... | ... |

FIG. 6D

MEMORY SYSTEM AND MAPPING METHODS USING A RANDOM WRITE PAGE MAPPING TABLE

CROSS REFERENCE TO RELATED APPLICATIONS

This application claims the benefit of U.S. Provisional Application No. 61/221,114, filed on Jun. 29, 2009, the entirety of which is incorporated by reference herein.

BACKGROUND OF THE INVENTION

1. Field of the Invention

The invention generally relates to memory systems comprising flash memory, and more particularly, to a memory system and mapping methods thereof.

2. Description of the Related Art

A nonvolatile memory maintains data previously written to its constituent memory cell even when the memory loses power. Flash memory is one specific type of nonvolatile memory which is widely used in computers, memory cards, etc. Flash memory is a preferred memory choice in many applications because its memory cells may be electrically erased in bulk. Recently, flash memory is being applied more and more in portable devices such as cell phones, PDAs, and digital cameras. More generally, flash memory is being used with increasing frequency as a replacement of hard disks and other types of data storage devices.

Flash memory is classified into NOR type and NAND type flash memories, according to a connection state between respective cells and bit lines. NOR flash memory has a high read speed and a low write speed and is thus used mainly for coded memory applications. In contrast, NAND flash memory has a high write speed and a low price per unit area and is thus used mainly for large-capacity storage applications. Meanwhile, when compared to other types of memory, flash memory provides relatively high speed read operations at a relatively low unit cost. The operation of flash memory is characterized by the execution of an erase operation before a write operation. This characteristic makes it difficult for flash memory to be applied as a main memory. It also makes it difficult for flash memory to be applied as a general hard disk filing system even in applications with flash memory used as an auxiliary memory source. Accordingly, a flash translation layer (FTL) is commonly used between a file system and flash memory in order to make the programming characteristics inherent in flash memory recognizable to the host device.

The FTL serves to map a logical address generated by the file system into a physical address of the flash memory during a flash memory write operation. The FTL typically uses an address mapping table to perform a rapid address mapping operation. Using an FTL address mapping function, a host device may operationally recognize a flash memory as a hard disk or SRAM, and may thus access the flash memory in the same manner as the hard disk or SRAM.

BRIEF SUMMARY OF THE INVENTION

An embodiment of a memory system is provided, in which an interface device is coupled between a flash memory and a host, and stores a flash translation layer. The flash translation layer utilizes a data block mapping table and a page mapping table to manage data blocks and log blocks of the flash memory by a page mapping scheme and utilizes a random write page mapping table independent from the block mapping table and the page mapping table to manage random write blocks of the flash memory by a random write mapping scheme.

The invention also provides an embodiment of a mapping method for a memory system, in which the memory system comprises a flash memory and an interface device coupled between the flash memory and a host, and the interface device stores a flash translation layer. In the mapping method, data blocks and log blocks of the flash memory are managed by utilizing a block mapping table and a page mapping table corresponding to the block mapping table by a page mapping scheme, and random write blocks of the flash memory are managed by utilizing a random page mapping table independent from the block mapping table and the page mapping table by a random write mapping scheme.

The invention also provides another embodiment of the memory system, in which an interface device is coupled between a flash memory and a host and stores a flash translation layer. The flash translation layer utilizes a data block mapping table, a log block mapping table and a page mapping table to manage the first data block by a page mapping scheme. The flash translation layer further converts a first data block of the flash memory into a first random write block and utilizes a random write page mapping table independent from the block mapping table, the log block mapping table and the page mapping table to manage the first random write block, when following access to a first logical block of the flash memory is a random single write operation.

The invention also provides another embodiment of the mapping method of the memory system, in which the memory system comprises a flash memory and an interface device coupled between the flash memory and a host. The interface device stores a flash translation layer. In the mapping method, a first data block of the flash memory is managed by utilizing a data block mapping table, a log block mapping table and a page mapping table by a page mapping scheme, and the first data block is converted into a first random write block when following access to a first logical block of the flash memory is a random single write operation, wherein the first random write block is managed by utilizing a random write page mapping table independent from the data block mapping table, the log block mapping table and the page mapping table.

BRIEF DESCRIPTION OF DRAWINGS

The invention can be more fully understood by reading the subsequent detailed description and examples with references made to the accompanying drawings, wherein:

FIGS. 5A~5G illustrate examples for managing memory blocks under a page mapping scheme;

FIGS. 6A~6D illustrate examples for managing memory blocks under a random write mapping scheme.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
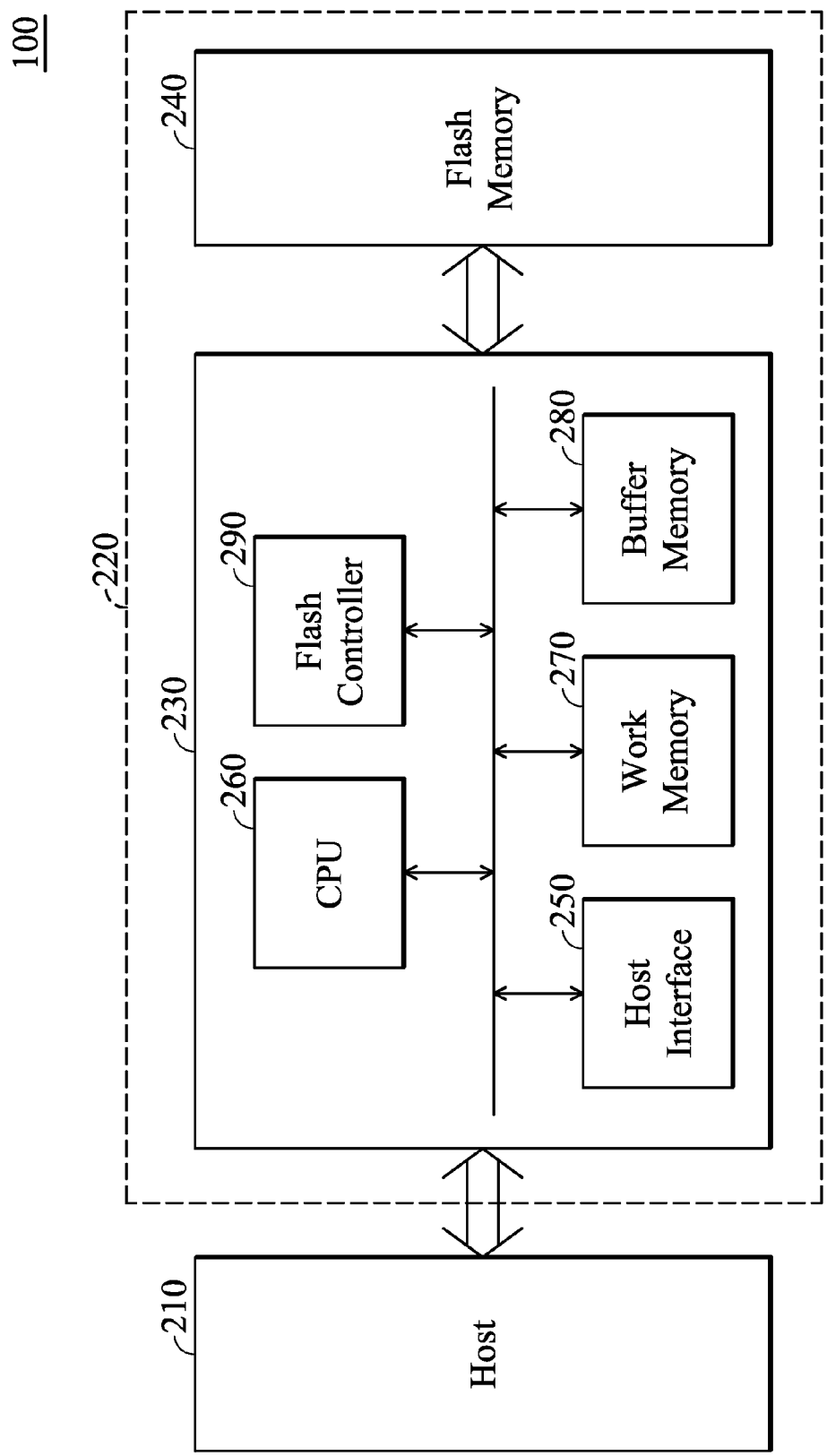
FIG. 1 is a schematic block diagram showing a memory system according to some embodiments of the invention.

FIG. 1 is a schematic block diagram showing a memory system according to some embodiments of the invention. As shown in FIG. 1, a memory system 100 includes a host 210 and a storage device 220. The memory system 100 may be used in a portable electronic device, such as a laptop computer, digital camera, digital music player, cellular telephone, personal data assistant ("PDA"), or the like. The storage device 220 includes an interface device 230 and a flash memory 240. The storage device 220, for example, can also be applied as an external memory card. The storage device 220 may be a solid-state disk ("SSD"), SD card, MMC, Memory Stick, an embedded card such as moviNAND, GBNAND, iNAND, or the like. The interface device 230 controls the flash memory 240 when access to the flash memory 240 is requested from the host 210. For example, the interface device 230 controls a read/write/erase operation of the flash memory 240. The interface device 230 manages mapping information of the flash memory 240 so that the host 210 may use the flash memory 240 for a read/write/erase operation that is similar to a read/write/erase operation performed by SRAMs/HDDs.

The interface device 230 includes a host interface 250, a CPU 260, a work memory 270, a buffer memory 280, and a flash controller 290. The host interface 250 provides an interface between the storage device 220 and the host 210, and the CPU 260 controls the operation of the storage device 220. The work memory 270 is used to store software/firmware needed to perform FTL functions. The work memory 270 is also used to store mapping information of the flash memory 240. Mapping information of the flash memory 240 is stored in a region (e.g., a meta field) of the flash memory 240, and is automatically loaded onto the work memory 270 when powered-up. Also, software and/or application programs required for the FTL functions is stored in a region (e.g., a boot code region) of the flash memory 240 and is automatically loaded onto the work memory 270 when powered-up.

In some embodiments of the invention, merge state information is also stored in the work memory 270. Whenever a command, such as a read command, a write command or an erase command, is transmitted from the host 210, the CPU 260 refers to the merge state information in the work memory 270 and controls a scheme for merging that will be described below. The buffer memory 280 is used to store data in the flash memory 240 or read data from the flash memory 240. The buffer memory 280, for example, may have a storage capacity that corresponds to a page size of the flash memory 240. Each of the work memory 270 and the buffer memory 280 may be applied as a volatile memory, such as an SRAM. The flash controller 290 is configured to perform access operations, such as read, write and erase operations, of the flash memory 240 under the control of the CPU 260.

While described herein as separate memories, the work memory 270 and the buffer memory 280 may be applied in one memory, such as an SRAM, so as to perform the same functions as described herein with reference to the two memories. The flash memory 240 includes a memory cell array that includes a plurality of memory blocks (not shown). Each memory block includes a plurality of pages (not shown). One page corresponds to either one sector or a plurality of sectors. In some embodiments of the invention, memory blocks of the memory cell array, as set forth above, are divided into a data region, a log region, a random write region, a space region, a meta region, and etc. Also, the memory cell array further includes a memory block that stores a boot code and/or FTL. The array architecture of the flash memory 240 is not, however, limited to the architecture as described herein. In other words, the architecture of the memory cell array may be modified depending on the mapping technique of the FTL.

Figure 2:
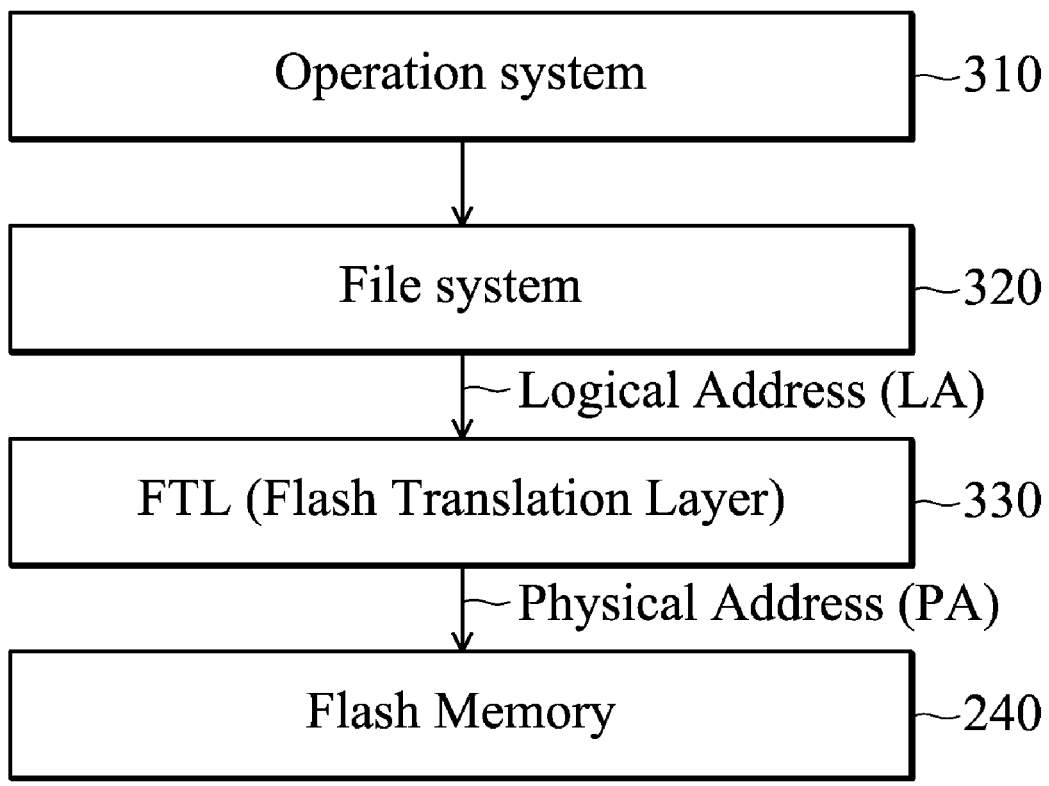
FIG. 2 is a block diagram conceptually illustrating implementation of software in the memory system of FIG. 1.

FIG. 2 is a block diagram conceptually illustrating implementation of software in the memory system 100 of FIG. 1. Referring to FIG. 2, a memory system may implement software including an operation system 310, a file system 320, and an FTL 330. As illustrated in FIG. 2, the operation system 310 communicates with the file system 320, the file system 320 communicates with the FTL 330, and the FTL 330 communicates with the flash memory 240 of the memory system 100.

The FTL 330 receives a logical address LA from the file system 320 and translates the received logical address LA into a physical address PA. The physical address PA may be provided to the flash memory 240, and the flash memory 240 may access the memory cells corresponding to the received physical address PA. In addition, the FTL 330 may comprise at least one address mapping table for address conversion. The address mapping table(s) may be loaded onto the work memory 270 from the flash memory 240 and the address mapping table(s) may be used in the work memory 270.

Figure 3:
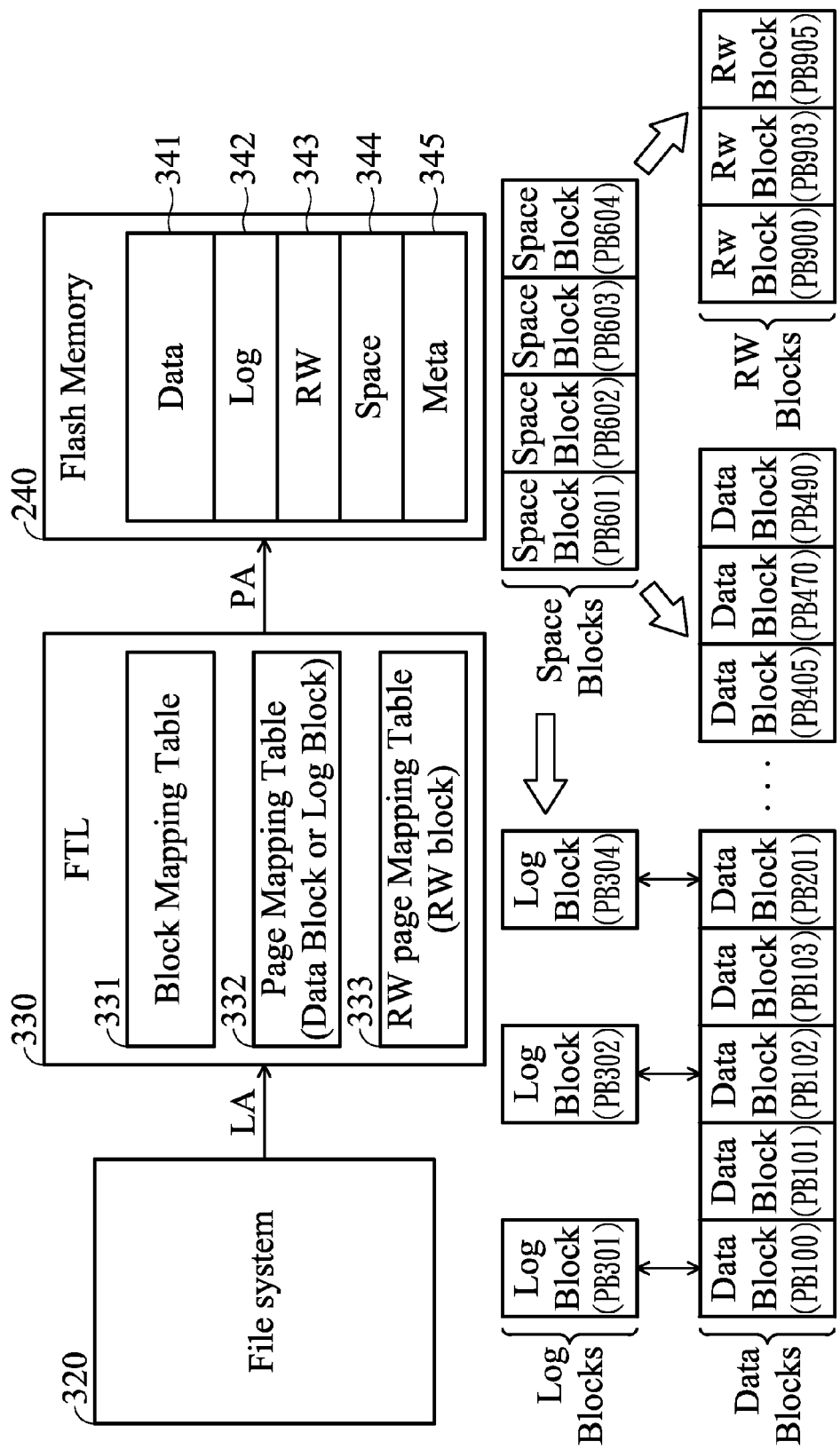
FIG. 3 is a block diagram conceptually illustrating implementation of an improved mapping method in the memory system corresponding to FIGS. 1 and 2.

FIG. 3 is a block diagram conceptually illustrating implementation of an improved mapping method in the memory system 100 corresponding to FIGS. 1 and 2. FIG. 3 illustrates the file system 320, the FTL 330 and the flash memory 240 of the memory system 100. In the embodiment illustrated in FIG. 3, the FTL 330 receives a logical address LA from the file system 320 and converts the received logical address LA into a physical address PA using mapping tables 331, 332 and 333.

As illustrated in FIG. 3, the FTL 330 comprises a block mapping table 331, a page mapping table 332 which is related to the block mapping table 331, and a random write (RW) page mapping table 333 which is independent from the block mapping table 331 and the page mapping table 332. The block mapping table 331 is used to map a logical block number (LBN) of at least one logic block to a physical block number (PBN) of a physical memory block (i.e., a data block, a log block or space block). It should be noted that the log block(s) can also be referred as active block(s) in some cases. In general cases, logical block number(s) and/or logical page number(s) is/are recognized/used by the host device and physical block number(s) and/or physical page number(s) is/are recognized/used by flash memory, but is not limited thereto. The page mapping table 332 is used for page mapping of data blocks with a log block or several log blocks. For example, the page mapping table 332 is used to map a logical page number (LPN) of at least one logic block to a physical page number (PPN) of a data block or a log block. The RW page mapping table 333 is used for page mapping of random write blocks. Similarly, the RW page mapping table 333 is used to map a logical page number (LPN) of at least one logic block to a physical page number (PPN) of one of the random write blocks. In some embodiments, the block mapping table 331 may comprise a data block mapping table and a log block mapping table, but is not limited thereto.

Still referring to FIG. 3, the flash memory 240 comprises a plurality of memory blocks implementing a plurality of data blocks having the physical block numbers PB100, PB101, PB102, PB103, . . . , PB470, and PB490; a plurality of log blocks having the physical block numbers PB301, PB302 and PB304; a plurality of space blocks having the physical block numbers PB601, PB602, PB603 and PB604; and a plurality of random write (RW) blocks having the physical block numbers PB900, PB903 and PB905. In addition, the flash memory 240 may conceptually comprise a data region 341, a log region 342, a random write (RW) region 343, a space region 344 and a meta region 345. In some embodiments, the flash memory 240 may not have physical data, log, RW or space regions. Rather, the data blocks, the log blocks, the RW blocks and the space blocks implemented in the flash memory 240 may conceptually form the data region 341, the log region 342, the RW region 343 and the space region 344, respectively.

Note that those regions may be conceptual rather than physical identifiable regions in the flash memory 240, wherein the conceptual regions will be illustrated and referred to herein. The data region 341 comprises the plurality of data blocks having the physical block numbers PB100, PB101, PB102, PB103, . . . , PB470, and PB490 and stores user data. For example, the data blocks are used to store sequential write data and/or cold data which is seldom accessed by the host 210. The log region 342 comprises the plurality of log blocks having the physical block numbers PB301, PB302 and PB304, each of which is assigned to one or more data blocks of the flash memory 240. For example, the log blocks are used to store overwrite data and/or non-sequential data (discontinuous data). The RW region 343 comprises the plurality of RW blocks having the physical block numbers PB900, PB903 and PB905 and stores user data which belongs to random single write data and/or hot data.

The space region 344 comprises the plurality of space blocks having the physical block numbers PB601, PB602, PB603 and PB604, each of which may be converted into a log block, a data block, or a RW block. For example, if all log blocks assigned to a data block are used, then a space block may be converted into a log block, which may then be assigned to the data block. Additionally, data blocks, log blocks and/or RW blocks erased after a merge operation may be converted into space blocks, and may subsequently be converted into data, log, and/or RW blocks according to the assigning operation. In some embodiments of the invention, when some predetermined conditions are satisfied, a data block (and a corresponding log block if any) may also be converted into RW block(s) or a RW block may be converted into a data block, and the detailed operations for these conversions would be illustrated below. Changed mapping information in accordance with a merge operation may be stored in the meta region 345.

Figure 4:
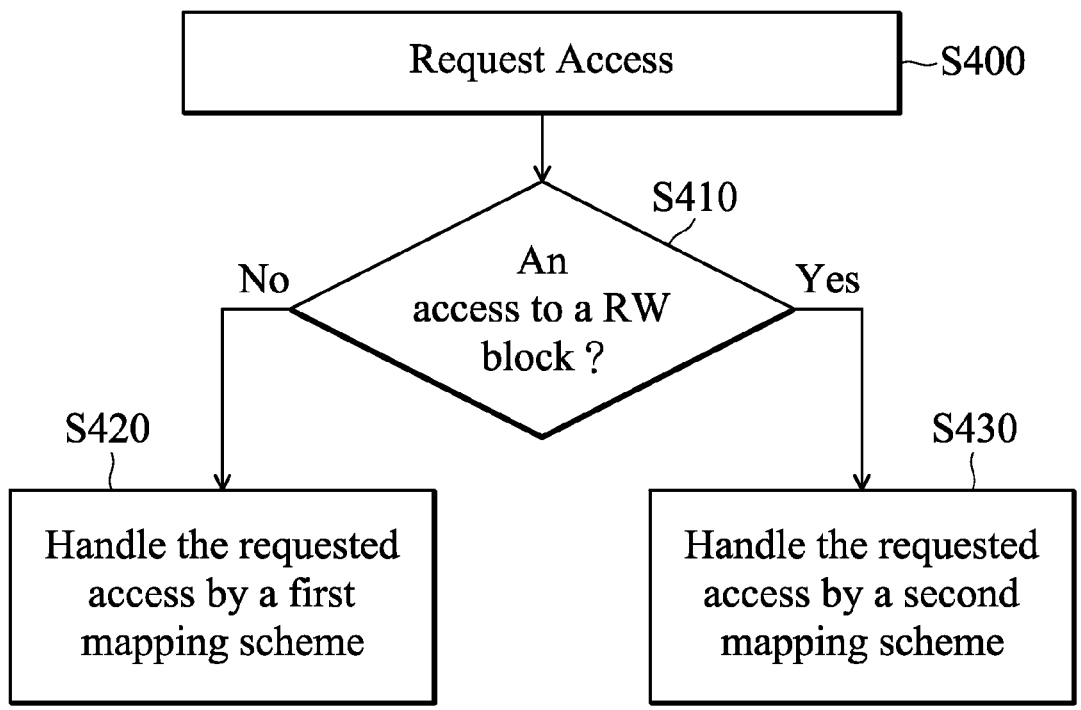
FIG. 4 shows a flowchart illustrating a process for managing mapping data of the flash memory in the memory system.

FIG. 4 shows a flowchart illustrating a process for managing mapping data of the flash memory in the memory system. First, in step S400, access to the flash memory 240 is requested from the host 210 (i.e., a command from the file system 320 or the operation system 310 executed on the host 210 is received). In step S410, the FTL 320 executed on the CPU 260 of the interface device 230 determines the pattern of the currently requested access. For example, when access is requested from the host 210, the FTL 330 extracts logical address information from the input data, and determines whether the requested access is to access a random write (RW) block. If it is determined that the requested access is to access a RW block, step S430 is performed. If it is determined that the requested access is not to access a RW block, step S420 is performed. In step S420, the requested access is handled by a first mapping scheme, and in step S430, the requested access is handled by a second mapping scheme different and independent from the first mapping scheme. For example, in this embodiment, the requested access is handled by a hybrid mapping scheme (i.e., page mapping scheme) with the block mapping table 331 (and the page mapping table 332 if necessary) in step S420, but is not limited thereto. On the contrary, the requested access is handled by a random write mapping scheme (i.e., a random write page mapping scheme) with the RW page mapping table 333 independent from the block mapping table 331 and the page mapping table 332 in step S430, but is not limited thereto. Detailed operations of steps S420 and 430 will be described below. It should be noted that the RW page mapping table 333 can be partially or completely stored in the flash memory 240, and be loaded onto the work memory 270 from the flash memory 240 (FIG. 1) when necessary.

For the sake of convenience in description, it is assumed that each memory block of the flash memory 240 has four pages, but it is not limited thereto. Namely, persons skilled in the art can understand that each memory block of the flash memory 240 can also have more than four pages.

Here, illustrative examples of step S420 with no accessing to a RW block will be described with reference to FIGS. 5A-1~5A-4, and 5B~5G. In step S420, the requested access is not an access to a RW block, but it may be a write operation or a read operation of a memory block, such as a data block or a log block corresponding to a logical block. A first illustrative example of step S420 will be described with reference to FIGS. 3 and 5A-1~5A-4.

For example, if a first access is requested to write data corresponding to a logical page number (LPN) LP2 in a logical block having a logical block number (LBN) LB108, the FTL 330 determines whether there is a data block corresponding to the logical block having the logical block number LB108. If there is no data block corresponding to the logical block having the logical block number LB108, the FTL 330 assigns a space block (i.e., a memory block) having a physical block number (PBN) PB601 to serve as a data block for the logical block having the logical block number LB108, and then the FTL 330 writes the data corresponding to the logical page number LP2 into the physical page with physical page number PPA0 in the data block having the physical block number PB601. In this embodiment, the logical page having the logical page number LP2 is the third page of the logical block having the logical block number LB108 rather than the first page, and the data corresponding to the logical page LP2 is not limited to be written into the third page of the data block having the physical block number PB601.

In some embodiments, the FTL 330 obtains the logical page number (LPN), the logical block number (LBN) and a logical offset page number (LOPN) in sequence according to a logic sector number in the input data from the host 210, but is not limited thereto. In addition, the FTL 330 records the mapping relationships between the logical block having the logical block number LB108 and the data block having the physical block number PB601 into a data block mapping table 331A of the block mapping table 331. As shown in the data block mapping table 331A, the data block having the physical block number PB100 corresponds to the logical block having the logical block number LB0, the data block having the physical block number PB101 corresponds to the logical block having the logical block number LB1, the data block having the physical block number PB102 corresponds to the logical block having the logical block number LB2, . . . , the data block having the physical block number PB490 corresponds to the logical block having the logical block number LB107, and the data block having the physical block number PB601 corresponds to the logical block having the logical block number LB108. For example, the FTL 330 determines that the requested access and/or the consequent access(es) is/are random single write operation(s) according to access information (i.e., the write address(es) in the instruction(s)) from the host 210, but is not limited thereto. As shown in FIG. 5A-1, the FTL 330 further records the physical page having the physical page number PPA0 of the data block having the physical block number PB601 into the page mapping table 332. As shown in the page mapping table 332, the physical page having the physical page number PPA0 corresponds to the logical page number LP2.

If a second access is then requested to write data corresponding to a logical page number LP3 in the logical block having the logical block number LB108, the FTL 330 determines whether the data to be written is sequential data with respect to the data corresponding to the logical page number LP2 stored in the data block having the physical block number PB601. Then, the FTL 330 writes the data corresponding to the logic page number LP3 into the physical page with physical page number PPA1 of the data block having the physical block number PB601, if the data to be written is sequential data with respect to the data corresponding to the logical page number LP2. As shown in FIG. 5A-1, the FTL 330 further records the physical page having the physical page number PPA1 of the data block having the physical block number PB601 into a page mapping table 332. As shown in the page mapping table 332, the physical page having the physical page number PPA1 corresponds to the logical page number LP3.

If a third access is then requested to write data corresponding to a logic page number LP1 in the logical block having the logical block number LB108, the FTL 330 determines whether the data to be written is sequential data with respect to the data corresponding to the logical page number LP3 stored in the data block having the physical block number PB601. Because the data to be written is not sequential data with respect to the data corresponding to the logical page number LP3, the FTL 330 assigns a memory block with a physical block number PB602 to serve as a log block for the data block having the physical block number PB601. In addition, the FTL 330 records the mapping relationships between the log block having the physical block number PB602 and the data block having the physical block number PB601 into a log block mapping table 331B of the block mapping table 331. As shown in the page mapping table 332, the physical page having the physical page number PPA0 corresponds to the logical page number LP2 and the physical page having the physical page number PPA1 corresponds to the logical page number LP3. Then, the FTL 330 writes the data corresponding to the logical page number LP1 into the physical page with the physical page number PPB0 of the log block having the physical block number PB602, and records the mapping relationships between the physical page having the physical page number PPB0 and the logical page number LP1 (i.e., the physical page having the physical page number PPB0 corresponds to the logical page number LP1) into the page mapping table 332. As shown in the page mapping table 332 of FIG. 5A-2, the physical page having the physical page number PPB0 corresponds to the logical page number LP1.

If a fourth access is then requested to write data corresponding to a logical page number LP0 in the logical block having the logical block number LB108 and the FTL 330 determines that the logical block having the logical block number LB108 corresponds to the data block having the physical block number PB601 with the log block having the physical block number PB602, the FTL 330 writes the data corresponding to the logical page number LP0 into the physical page with physical page number PPB1 of the log block having the physical block number PB602. The FTL 330 then records the mapping relationships between the physical page PPB1 and the logical page number LP0 (i.e., the physical page having the physical page number PPB1 corresponds to the logical page number LP0) into the page mapping table 332. As shown in the page mapping table 332 of FIG. 5A-2, the physical page having the physical page number PPB1 corresponds to the logical page number LP0.

Similarly, according to fifth and sixth accesses, data corresponding to a logical page numbers LP3 and LP0 in the logical block having the logical block number LB108 are written into physical page having the physical page numbers PPB2 and PPB3 respectively, and the mapping relationships between the physical pages having the physical page numbers PPB2 and PPB3 and the logical page numbers LP3 and LP0 are recorded (updated) into the page mapping table 332. As shown in the page mapping table 332 of FIG. 5A-3, the physical pages having the physical page numbers PPB2 and PPB3 corresponds to the logical page numbers LP3 and LP0 respectively. At this time, the data stored in the physical page having the physical page number PPA1 of the data block having the physical block number PB601, and physical page having the physical page number PPB1 of the log block having the physical block number PB602 becomes invalid. In this embodiment, the FTL 330 assigns a log block for the data block when the data to be written is not sequential data with respect to previously written data or overwrites the previously written data, but is not limited thereto.

Another illustrative example of step S420 will be described with reference to FIG. 5A-4. If a seventh access is then requested to write data corresponding to a logical page number LP1 in the logical block having the logical block number LB108, the FTL 330 writes the data corresponding to the logical page number LP1 into the physical page with physical page number PPA2 of the log block having the physical block number PB601. The FTL 330 then records (i.e., updates) the mapping relationships between the physical page having the physical page number PPA2 and the logical page number LP1 (i.e., the physical page having the physical page number PPA2 corresponds to the logical page number LP1) into the page mapping table 332. As shown in the page mapping table 332 of FIG. 5A-4, the physical pages having the physical page number PPA2 corresponds to the logical page number LP1. At this time, the data stored in the physical page having the physical page number PPB0 of the log block having the physical block number PB602 becomes invalid. In this embodiment, once the log block having the physical block number PB602 is assigned for the data block having the physical block number PB601, the FTL 330 would utilize the space page of the data block having the physical block number PB601 in page mapping manner.

Further, if the FTL 330 further determines that following access to the logical block having the logical block number LB108 is a random single write operation, the FTL 330 would then convert the data block having the physical block number PB601 and the log block having the physical block number PB602 into RW blocks for following access (i.e., random single write operations). Consequently, the FTL 330 uses the RW page mapping table 333 to record the mapping relationships between logical page numbers of the logical block having the logical block number LB108 and physical pages of the RW blocks having the physical block numbers PB601 and PB602. For example, the FTL 330 records the valid pages (i.e., the physical pages having the physical page numbers PPA0, PPA2, PPB2, PPB3) of the RW blocks having the physical block numbers PB601 and PB602 into the RW page mapping table 333. As shown in the RW page mapping table 333 of FIG. 5B, the physical pages having the physical page number PPB3, PPA2, PPA0 and PPB2 corresponds to the logical page numbers LP0~LP3 respectively. Meanwhile, the FTL 330 deletes the mapping relationships between the logical block having the logical block number LB108 and the data block having the physical block number PB601 in the data block mapping table 331A, the mapping relationships between the data block having the physical block number PB601 and the log block having the physical block number PB602 in the log block mapping table 331B, and the mapping relationships between the logical page numbers of the logical block having the logical block number LB108 and the physical pages of the data block having the physical block number PB601 and log block having the physical block number PB602 in the page mapping table 332, such that the RW page mapping table 333 is independent from the data block mapping table 331A, the log block mapping table 331B and the page mapping table 332. Details of the random write operations will be described later.

Another illustrative example of step S420 will be described with reference to FIGS. 5C and 5D. If an eighth access is then requested to write data corresponding to a logical page number LP1 in the logical block having the logical block number LB108 after the fourth access shown in FIG. 5A-3, the FTL 330 determines that the log block having the physical block number PB602 is full and the FTL 330 writes the data corresponding to the logical page number LP1 into the physical page with physical page number PPA2 of the data block having the physical block number PB601. The FTL 330 then records the mapping relationships between the physical page having the physical page number PPA2 and the logical page number LP1 (i.e., the physical page having the physical page number PPA2 corresponds to the logical page number LP1) into the page mapping table 332. Similarly, according to a ninth request, data corresponding to a logical page number LP0 in the logical block having the logical block number LB108 can also be written into a physical page having the physical page number PPA3 and the mapping relationships between the physical pages having the physical page number PPA3 and the logical page numbers LP0 would be recorded into the page mapping table 332. As shown in the page mapping table 332 of FIG. 5C, the physical pages having the physical page numbers PPA2 and PPA3 corresponds to the logical page numbers LP1 and LP0 respectively. At this time, the data stored in the physical page having the physical page number PPB0 of the data block having the physical block number PB602 and physical page having the physical page number PPB3 of the log block having the physical block number PB602 becomes invalid. For the sake of convenience in description, it is assumed that only one log block can be assigned to one data block. However, those skilled in the art can understand that multiple log blocks may be assigned to one data block.

In this embodiment of the invention, when the FTL 330 determines that the data block having the physical block number PB601 and the log block having the physical block number PB602 are full, it is determined that data of the logical block having the logical block number LB108 (i.e., data stored in the data block having the physical block number PB601 and the log block having the physical block number PB602) is hot data. Consequently, as shown in FIG. 5D, the FTL 330 converts the data block having the physical block number PB601 and the log block having the physical block number PB602 into RW blocks, assigns a space block having the physical block number PB603 to serve as another RW block for the logical block having the logical block number LB108, and uses the RW page mapping table 333 to record the mapping relationships between logical page numbers of the logical block having the logical block number LB108 and physical pages of the RW blocks having the physical block numbers PB601-PB603 for following data write operations.

For example, the FTL 330 records the valid pages (i.e., the physical pages having the physical page numbers PPA0, PPA2, PPA3 and PPB2) of the RW blocks having the physical block numbers PB601 and PB602 into the RW page mapping table 333. As shown in the RW page mapping table 333 of FIG. 5D, the physical pages having the physical page number PPA3, PPA2, PPA0 and PPB2 corresponds to the logical page numbers LP0~LP3 respectively. Meanwhile, the FTL 330 deletes/updates the mapping relationships between the logical block having the logical block number LB108 and the data block having the physical block number PB601 in the data block mapping table 331A, between the data block having the physical block number PB601 and the log block having the physical block number PB602 in the log block mapping table 331B, and between the logical page numbers of the logical block having the logical block number LB108 and the physical pages of the data block having the physical block number PB601 and log block having the physical block number PB602 in the page mapping table 332, such that the RW page mapping table 333 is independent from the data block mapping table 331A, the log block mapping table 331B and the page mapping table 332. Detailed operations for accessing the RW blocks will be described later.

Another illustrative example of step S420 will be described with reference to FIG. 5E. After the data corresponding to the logical page number LP0 is written into the physical page having the physical page number PPB3 of the log block having the physical block number PB602 (shown in FIG. 5A-1), if a tenth access is then requested to write data corresponding to a logical page number LP128 in the logical block having the logical block number LB109, the FTL 330 determines whether there is a data block corresponding to the logical block having the logical block number LB109. If there is no data block corresponding to the logical block having the logical block number LB109, the FTL 330 assigns a space block having a physical block number having the physical block number PB603 to serve as a data block for the logical block having the logical block number LB109, and then the FTL 330 writes the data corresponding to the logical page number LP128 into the physical page with physical page number PPC0 in the data block having the physical block number PB603. In this embodiment, the logical page LP128 is the first page of the logical block having the logical block number LB109. In addition, the FTL 330 records the mapping relationships between the logical block having the logical block number LB109 and the data block having the physical block number PB603 into the data block mapping table 331A (i.e., the data block having the physical block number PB603 corresponds to the logical block having the logical block number LB109). When an eleventh access is then requested to write data corresponding to a logical page number LP129 in the logical block having the logical block number LB109, the FTL 330 writes the data corresponding to the logical page number LP129 into the physical page with physical page number PPC1 of the data block having the physical block number PB603, if the current data is sequential data with respect to the data corresponding to the logical page number LP128. In addition, the FTL 330 further records the mapping relationships between the physical pages having the physical page numbers PPC0 and PPC1 and the logical page numbers LP128 and LP129 into the page mapping table 332". As shown in the page mapping table 332" of FIG. 5E, the physical pages having the physical page numbers PPC0 and PPC1 corresponds to the logical page numbers LP128 and LP129.

Another illustrative example of step S420 will be described with reference to FIG. 5F. If a twelfth access is then requested to write data corresponding to a logical page number LP130 in the logical block having the logical block number LB109, the FTL 330 writes the data corresponding to the logical page number LP130 into the physical page with physical page number PPC2 of the data block having the physical block number PB603. The FTL 330 then records the mapping relationships between the physical pages having the physical page number PPC2 and the logical page numbers LP130 into the page mapping table 332". As shown in the page mapping table 332" of FIG. 5F, the physical pages having the physical page number PPC2 corresponds to the logical page number LP130. Further, if the FTL 330 determines that following access to the logical block having the logical block number LB109 is a random single write operation, the FTL 330 converts the data block having the physical block number PB603 into a RW block. Consequently, the FTL 330 uses the RW page mapping table 333" to record the mapping relationships between logical page numbers of the logical block having the logical block number LB109 and physical pages of the RW block having the physical block number PB603. For example, the FTL 330 records the valid pages (i.e., the physical pages having the physical page numbers PPC0-PPC2) of the RW block having the physical block number PB603 into the RW page mapping table 333. Meanwhile, the FTL 330 deletes/updates the mapping relationships between the logical block having the logical block number LB109 and the data block having the physical block number PB603 in the data block mapping table 331A, such that the RW page mapping table 333 is independent from the data block mapping table 331A and the log block mapping table 331B.

Another illustrative example of step S420 will be described with reference to FIG. 5G. After the data corresponding to the logical page number LP0 in the logical block LB108 is written into the physical page PPB3 of the log block having the physical block number PB602 illustrated in FIG. 5A-3, if a thirteenth access is then requested to write data corresponding to a logical page number LP128 in the logical block having the logical block number LB109, the FTL 330 determines whether there is a data block corresponding to the logical block having the logical block number LB109. The FTL330 assigns a space block to serve as a data block for the logical block having the logical block number LB109 when there is no data block corresponding to the logical block having the logical block number LB109. At this time, if the number of space blocks in the flash memory is insufficient, a merge operation may be performed to generate additional space blocks. That is, a data block and log block(s) assigned to the data block may be converted into space blocks via a merge operation (also called garbage collection). The merge operation will be described hereinafter. For example, the FTL 330 assigns a space block having the physical block number PB603 to serve as a new data block for the logical block having the physical block number PB108, copies the valid data in the old data block having the physical block number PB601 and the log block having the physical block number PB602 into the new data block having the physical block number PB603, erases the blocks having the physical block numbers PB601 and PB602, and recycles the blocks having the physical block number PB601 and PB602 to the space region to serve as space blocks. Further, the FTL 330 may also update the new mapping relationships between the logical block having the logical block number LB108 and the data block having the physical block number PB603 into the data block mapping table 331A and deletes the mapping relationships between the data block having the physical block number PB601 and the log block having the physical block number PB602 in the log block mapping table 311B. Consequently, the FTL 330 assigns a space block having the physical block number PB604 to serve as a data block for the logical block having the logical block number LB109, and writes the data corresponding to the logical page number LP128 into the physical page with physical page number PPD0 in the data block having the physical block number PB604. In addition, the FTL 330 may also record the mapping relationships between the logical block having the logical block number LB109 and the data block having the physical block number PB604 into the data block mapping table 331A.

Illustrative examples of step S430 with accessing to a RW block will be described hereinafter, with reference to FIGS. 6A~6D. A first example of step S430 will be described with reference to FIGS. 6A~6C. If a fourteenth access is then requested to write data corresponding to a logical page number LP128 in the logical block having the logical block number LB109 after the data block having the physical block number PB603 is converted into a RW block (illustrated in FIG. 5F), the FTL 330 determines that the requested access is to access a RW block (i.e., it may be a write operation or a read operation of a RW block). Consequently, the FTL 330 uses the RW page mapping table 333" which is independent from the data block mapping table 331 and the page mapping table 332 to handle the requested access, according to the random write mapping scheme. For example, as shown in FIG. 6A, when the FTL 330 determines that the RW block having the physical block number PB603 corresponds to the logical block having the logical block number LB109, the FTL 330 writes the data corresponding to the logical page number LP128 into the physical page with physical page number PPC3 of the RW block having the physical block number PB603. The FTL 330 then records the mapping relationships between the physical page having the physical page number PPC3 and the logical page number LP128 (i.e., the physical page having the physical page number PPC3 corresponds to the logical page number LP128) into the RW page mapping table 333.

If a fifteenth access is then requested to write data corresponding to a logical page number LP130 in the logical block having the logical block number LB109 and the FTL 330 determines that the RW block is full, the FTL 300 assigns a space block having the physical block number PB604 to serve as another RW block for the logical block having the logical block number LB109. Consequently, as shown in FIG. 6B, the FTL 330 writes the data corresponding to a logical page number LP130 in the logical block having the logical block number LB109 into the physical page with a physical page number PPD0 of the RW block having the physical block number PB604. In addition, the FTL 330 then records the mapping relationships between the physical page having the physical page number PPD0 and the logical page number LP130 (i.e., the physical page having the physical page number PPD0 corresponds to the logical page number LP130) into the RW page mapping table 333. At this time, the data stored in the physical page having the physical page number PPC2 of the RW block having the physical block number PB603 becomes invalid. If a sixteenth access is then requested to write data corresponding to the logical page number LP129 in the logical block having the logical block number LB109, the FTL 330 writes the data corresponding to the logical page number LP129 into the physical page with physical page number PPD1 in the RW block having the physical block number PB604 and records the mapping relationships between the physical page having the physical page number PPD1 and the logical page number LP129 into the RW page mapping table 333. At this time, the data stored in the physical page having the physical page number PPC1 of the RW block having the physical block number PB603 becomes invalid. Similarly, if a seventeenth access is then requested to write data corresponding to the logical page number LP128 in the logical block having the logical block number LB109, the FTL 330 writes the data corresponding to the logical page number LP128 into the physical page with physical page number PPD2 of the data block having the physical block number PB604 and records the mapping relationships between the physical page having the physical page number PPD2 and the logical page number LP128 into the RW page mapping table 333. At this time, the data stored in the physical page having the physical page number PPC3 of the RW block having the physical block number PB603 becomes invalid. For example, the FTL 330 can assign N RW blocks for one logical block and perform a garbage collection (GC) for the assigned RW blocks when the number of the assigned RW blocks reaches a predetermined number. In this embodiment, the FTL 330 assigns 3 RW blocks for one logical block at most, but is not limited thereto, and the FTL 330 performs a garbage collection to the assigned RW blocks when the assigned RW blocks are full.

When the FTL 330 determines that the number of space blocks in the flash memory is insufficient, a merge operation may be performed to the RW blocks having the physical block numbers PB603 and PB604 for generating additional space blocks. For example, as shown in FIG. 6C, the FTL 330 assigns a space block having the physical block number PB605 to serve as a new RW block for the logical block having the physical block number PB109, copies the valid data in the old RW blocks having the physical block numbers PB603 and PB604 into the new RW block having the physical block number PB605, erases the blocks having the physical block numbers PB603 and PB604, and recycles the blocks having the physical block numbers PB603 and PB604 to the space region to serve as space blocks. In this embodiment, the valid data of the logical pages having the logical page numbers LP128, LP129 and LP130 are stored into the physical pages having the physical page numbers PPE0, PPE1 and PPE2 respectively. Further, the FTL 330 may also update the new mapping relationships between the logical block having the logical block number LB109 and the RW block having the physical block number PB605 into the RW page mapping table 333. Namely, the FTL 330 also performs a garbage collection (i.e., the merge operation) to the RW block(s) to obtain space block(s) when the number of space blocks in the flash memory is insufficient (i.e., the number of the space block is lower than a predetermined number).

It is noted that the number of the RW block(s) used for a logical block, the number of log block(s) corresponding to a data block, and the number of the remained space blocks can be served as a part of the merge state information mentioned above. Further, the above numbered accesses, such as the first access, the second access, and so on, are not bound to mean the sequence and/or positions of the accesses, but are in aid of illustrating the embodiments of the invention.

Another illustrative example of step S430 will be described with reference to FIG. 6D. When the FTL 330 determines that following access to the logical block having the logical block number LB109 is a sequential data write operation, the FTL 330 converts the RW block having the physical block number PB605 into a data block. For example, the FTL 330 assigns a space block having the physical block number PB606 to serve as a data block for the logical block having the physical block number PB109, copies the valid data in the RW blocks having the physical block numbers PB603 and PB604 into the new RW block PB605, erases the blocks having the physical block numbers PB603 and PB604, and recycles the blocks having the physical block numbers PB603 and PB604 to the space region to serve as space blocks. Further, the FTL 330 may also update the new mapping relationships between the logical block having the logical block number LB109 and the data block having the physical block number PB606 into the data block mapping table 331A. In this embodiment, the valid data for the logical pages having the logical page numbers LP128, LP129 and LP130 are stored into the physical pages having the physical page numbers PPF0, PPF1 and PPF2 respectively. Consequently, the FTL 330 handles following access requests of the logical block having the logical block number LB109 by the hybrid mapping scheme (i.e., page mapping scheme) with the data block mapping table 331A (and the log block mapping table 331B and the page mapping table 332 if necessary).

Figure 7:
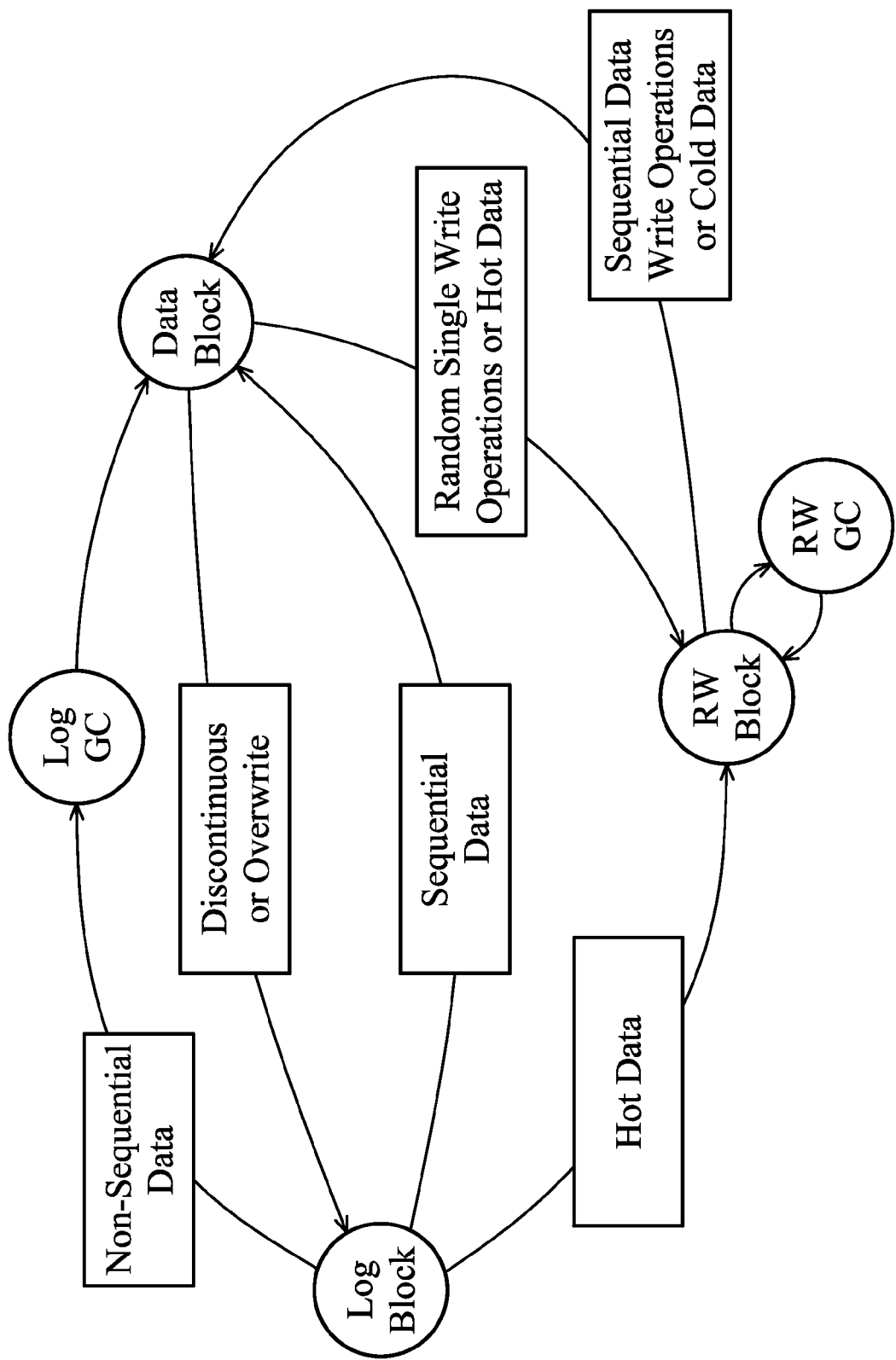
FIG. 7 is a schematic diagram illustrating a relationship between a data block, a log block and an RW block according to embodiments of the invention.

FIG. 7 is a schematic diagram illustrating a relationship between a data block, a log block and an RW block according to some embodiments of the invention. As shown, the memory system may comprise three kinds of blocks, i.e., a data block, a log block and a random write (RW) block. With regard to a data block corresponding to a logical block, if the FTL determines that the following data to be written is discontinuous data (i.e., non-sequential data) with respect to previously stored data or previously stored data is overwritten, the FTL creates or assigns the log block to the data block corresponding to the logical block for following data write operations. Alternatively, if the FTL determines that the following data to be written is random single write data or hot data, the FTL converts the data block into the RW block for following data write operations. For example, the FTL determines that the requested access and/or the consequent access(es) is/are random single write operation(s) or sequential data write operation(s) according to access information (i.e., the write address(es) in the instruction(s)) from the host, but is not limited thereto.

With regard to a log block, if the FTL determines that the following data to be written is non-sequential data, the FTL writes the data into the log block, and the FTL performs a garbage collection (GC) operation to the log block when the log block and the corresponding data block are full. Alternatively, if the FTL determines that the following data to be written is hot data, the FTL converts the log block and the corresponding data block into RW blocks for the following data write operations. For example, when the FTL determines that the data block and the log block are full, it is determined that data of the logical block (i.e., data stored in the data block and the log block) is hot data. Alternatively, if the FTL determines that the following data is sequential data with respect to previous stored data in the log block, the FTL replaces (i.e., swaps) the log block for the corresponding data block.

With regard to an RW block, if the FTL determines that the following data to be written is non-sequential data, the FTL writes the data into the RW block, and assigns another RW block for the logical block when the current RW block is full. The FTL performs a garbage collection (GC) operation to the RW blocks when number of the RW blocks reaches a predetermined number. Alternatively, if the FTL determines that the following data to be written is sequential write data or cold data, the FTL converts the RW block(s) into data block(s).

In the embodiments, because space pages of the data block(s) can be used to store data in a page mapping manner after the corresponding log block has no space page, the utility rate of the pages in the data block can be improved. In addition, if the hot data and random single write data of a logical block can be written into the multiple RW blocks, amount garbage collection operations for the data block and log block corresponding to the logical block can be reduced.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A memory system, comprising:
 a flash memory; and
 an interface device coupled between the flash memory and a host, storing a flash translation layer utilizing a block mapping table and a page mapping table to manage a plurality of data blocks and a plurality of log blocks of the flash memory by a page mapping scheme, and utilizing a random write page mapping table independent from the block mapping table and the page mapping table to manage a plurality of random write blocks of the flash memory by a random write mapping scheme.

2. The memory system of claim 1, wherein the block mapping table comprises a data block mapping table and a log block mapping table corresponding to the data block mapping table.

3. The memory system of claim 1, wherein the flash translation layer converts one of the data blocks corresponding to a logical block, into a random write block when following access to the logical block is a random single write operation.

4. The memory system of claim 3, wherein the flash translation layer determines whether the following access to the logical block is a random single write operation or a sequential data write operation according to access information provided from the host.

5. The memory system of claim 1, wherein the flash translation layer converts one of the random write blocks corresponding to a logical block into the data block when data stored into the converted random write block becomes cold data or following access to the logical block is a sequential data write operation.

6. The memory system of claim 1, wherein the flash translation layer converts one of the data blocks corresponding to a logical block and one of the log blocks corresponding to the converted data block into two random write blocks when data stored into the converted data block and the converted log blocks is hot data, or following access to the logical block is a random single write operation.

7. The memory system of claim 6, wherein the flash translation layer determines that data stored into the converted data block or the converted log block is hot data when the converted data block or the converted log block is full.

8. The memory system of claim 1, wherein when a number of the random write blocks converted corresponding to a logical block reaches a predetermined number, in which the predetermined number is larger than two, and the converted random write blocks are full, the flash translation layer performs a merge operation to the converted random write blocks.

9. A memory system, comprising:
 a flash memory; and
 an interface device coupled between the flash memory and a host, storing a flash translation layer, and utilizing a data block mapping table, a log block mapping table and a page mapping table to manage a first data block of the flash memory by a page mapping scheme, wherein the flash translation layer converts the first data block into a first random write block and utilizes a random write page mapping table independent from the block mapping table, the log block mapping table and the page mapping table to manage the first random write block when following access to a first logical block of the flash memory is a random single write operation.

10. The memory system of claim 9, wherein the flash memory further comprises a first log block corresponding to the first data block, and the flash translation layer converts the first data block and the first log block into the first random write block and a second random write block respectively and utilizes the random write page mapping table to manage the first and second random write blocks when the following access to the first logical block is a random single write operation.

11. The memory system of claim 10, wherein the flash translation layer determines whether the following access to the first logical block is a sequential data write operation according to access addresses provided from the host.

12. The memory system of claim 10, wherein the flash translation layer assigns a space block of the flash memory to serve as a third random write block for the first logical block, when a first access to the first logical block is requested and the first and second random write blocks are full.

13. The memory system of claim 12, wherein the flash translation layer performs a merge operation to the first, second and third random write blocks, when a second access to the first logical block is requested and the first, second and third random write blocks are full.

14. The memory system of claim 10, wherein the flash translation layer assigns a space block of the flash memory to serve as a third random write block, and copies valid data in the first and second random write blocks into the third random write block and erases the first and second blocks, when access to the first logical block is requested, the first and second random write blocks are full and a number of space blocks in the flash memory is lower than a predetermined number.

15. The memory system of claim 9, wherein the flash memory further comprises a second data block corresponding to a second logical block and a log block corresponding to the second data block, and the flash translation layer converts the second data block and the log block into the second random write block and a third random write block respectively, and utilizes the random write page mapping table to manage the second and third random write blocks, when data stored in the second data block and the log block is hot data.

16. The memory system of claim 15, wherein the flash translation layer assigns a third data block for the second logical block, copies valid data stored in the second and third random write blocks into the third data block and manages the third data block by the page mapping scheme, when the data stored in the second and third random write blocks becomes cold data.

17. The memory system of claim 15, wherein the flash translation layer determines that data stored in the second data block and the log block is hot data, when the second data block and the log block are full.

18. The memory system of claim 9, wherein the flash memory and the interface device form a memory card.

19. A mapping method for a memory system comprising a flash memory and an interface device coupled between the flash memory and a host, wherein the interface device stores a flash translation layer, comprising:
 managing data blocks and log blocks of the flash memory by utilizing a block mapping table and a page mapping table corresponding to the block mapping table by a page mapping scheme; and managing random write blocks of the flash memory by utilizing a random page mapping table independent from the block mapping table and the page mapping table by a random write mapping scheme.

20. The mapping method of claim 19, further comprising converting one of the data blocks corresponding to a logical block into a random write block when following access to the logical block is a random single write operation.

21. The mapping method of claim 20, wherein whether following access corresponding to the logical block is a random single write operation or a sequential data write operation is determined according to access information provided from the host.

22. The mapping method of claim 19, further comprising converting one of the random write blocks corresponding to a logical block into a data block when data stored into the converted random write block is cold data or the following access to the logical block is a sequential data write operation.

23. The mapping method of claim 19, further comprising converting one of the data blocks corresponding to a logical block and one of the log blocks corresponding to the converted data block into two random write blocks when data stored into the converted data block and the converted log block is hot data or access to the logical block is a random single write operation.

24. The mapping method of claim 23, wherein the flash translation layer determines that the data stored into the converted data block and the converted log block is hot data when the converted data block and the converted log block are full.

25. The memory system of claim 19, further comprising performing a merge operation to a set of the random write blocks when a number of the set of the random write blocks corresponding to a logical block reaches a predetermined number and the set of the random write blocks are full, wherein the predetermined number is larger than two.

26. A mapping method for a memory system comprising a flash memory and an interface device coupled between the flash memory and a host, wherein the interface device stores a flash translation layer, comprising:
managing a first data block of the flash memory by utilizing a data block mapping table, a log block mapping table and a page mapping table by a page mapping scheme, and converting the first data block into a first random write block and managing the first random write block by utilizing a random write page mapping table independent from the block mapping table, the log block mapping table and the page mapping table, when following access to a first logical block of the flash memory is a random single write operation.

27. The mapping method of claim 26, wherein the flash memory further comprises a first log block corresponding to the first data block, and the mapping method further comprises converting the first data block and the first log block into the first random write block and a second random write block respectively and managing the first and second random write blocks using the random write page mapping table, when the following access to the first logical block is a random single write operation.

28. The mapping method of claim 27, wherein whether the following access to the first logical block is a random single write operation or a sequential data write operation is determined according to access information provided from the host.

29. The memory system of claim 27, further comprising assigning a space block of the flash memory to serve as a third random write block for the first logical block when a first access to the first logical block is requested and the first and second random write blocks are full.

30. The memory system of claim 29, further comprising performing a merge operation to the first, second and third random write blocks, when a second access to the first logical block is requested and the first, second and third random write blocks are full.

31. The memory system of claim 27, further comprising performing a merge operation to the first and second random write blocks, assigning a space block of the flash memory to serve as a third random write block and copying valid data in the first and second random write blocks into the third random write block, when access to the first logical block is requested, the first and second random write blocks are full and a number of space blocks in the flash memory is lower than a predetermined number.

32. The mapping method of claim 26, wherein the flash memory further comprises a second data block corresponding to a second logical block and a log block corresponding to the second data block, and the mapping method further comprises converting the second data block and the log block into second and third random write blocks respectively and managing the second and third random write blocks utilizing the random write page mapping table, when data stored in the second data block and the log block is hot data.

33. The mapping method of claim 32, further comprising assigning a third data block for the second logical block, copying valid data stored in the second and third random write blocks into the third data block, and managing the third data block by the page mapping scheme, when data stored in the second and third random write blocks becomes cold data.

34. The memory system of claim 32, wherein the flash translation layer determines that the data stored in the second data block and the log block is hot data, when the second data block and the log block are full.

* * * * *